Oct. 23, 1923.

J. F. OHMER, JR 1,471,977

SPEED RECORDER

Filed Dec. 10, 1921

2 Sheets-Sheet 1

INVENTOR.
J. F. OHMER Jr.
By
Attorney

Oct. 23, 1923.

J. F. OHMER, JR 1,471,977

SPEED RECORDER

Filed Dec. 10, 1921    2 Sheets-Sheet 2

| SPEED. | MILES. | MISCELLANEOUS DATA. | | DATE. | | | MACHINE NO. TIME | | | | DRIVERS NUMBER. |
|---|---|---|---|---|---|---|---|---|---|---|---|
| 0 | 2 1 2 9 4 . 2 | UNL'D | 1 | JAN | 30 | A | 10 | 5 | 3 | 9 | 192 |
| 40 | 2 1 2 9 4 . 2 | UNL'D | 0 | JAN | 30 | A | 10 | 2 | 3 | 9 | 192 |
| 0 | 2 1 2 9 2 . 7 | UNL'D | 1 | JAN | 30 | A | 9 | 4 | 6 | 9 | 192 |
| 20 | 2 1 2 9 2 . 7 | UNL'D | 0 | JAN | 30 | A | 9 | 1 | 4 | 9 | 192 |
| 0 | 2 1 2 8 9 . 0 | LOAD | 2 | JAN | 30 | A | 8 | 3 | 6 | 9 | 192 |
| 15 | 2 1 2 8 9 . 0 | LOAD | 0 | JAN | 30 | A | 7 | 5 | 0 | 9 | 192 |
| 0 | 2 1 2 8 8 . 5 | GAS | 3 | JAN | 30 | A | 7 | 2 | 2 | 9 | 192 |
| 0 | 2 1 2 8 8 . 5 | GAS | 0 | JAN | 30 | A | 7 | 1 | 0 | 9 | 192 |
| 0 | 2 1 2 8 8 . 5 | | 0 | JAN | 30 | A | 7 | 0 | 0 | 9 | 192 |

Inventor
J.F. OHMER Jr.
By
Attorney

Patented Oct. 23, 1923.

1,471,977

UNITED STATES PATENT OFFICE.

JOHN F. OHMER, JR., OF DAYTON, OHIO, ASSIGNOR TO JOHN F. OHMER, OF DAYTON, OHIO.

SPEED RECORDER.

Application filed December 10, 1921. Serial No. 521,324.

*To all whom it may concern:*

Be it known that I, JOHN F. OHMER, Jr., a citizen of the United States, residing at Dayton, in the county of Montgomery and State of Ohio, have invented certain new and useful Improvements in Speed Recorders, of which the following is a specification, reference being had therein to the accompanying drawing.

This invention relates to a speed recorder for motor vehicles and the like.

One object of the invention is to provide a device which will preserve a record of the highest speed at which a vehicle moves during any interval, such as a given period of time, or a given trip.

A further object of the invention is to provide such a device in which the recording element will be retained at the highest speed attained, without interfering with the operation of the other parts of the mechanism, until a record has been taken therefrom.

Other objects of the invention will appear as the device is described in detail.

Figure 1:
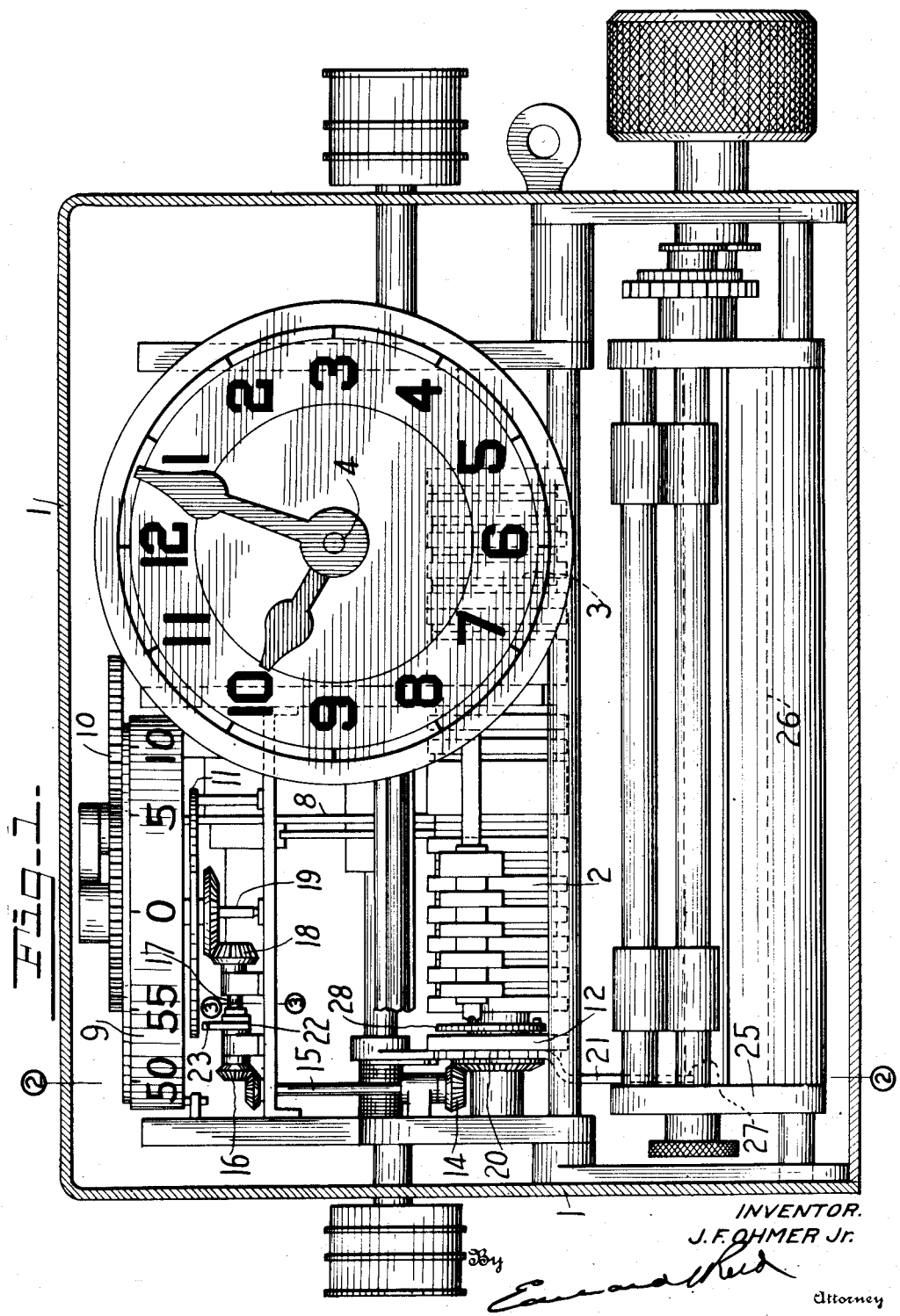
Figures 2, 3, 4:
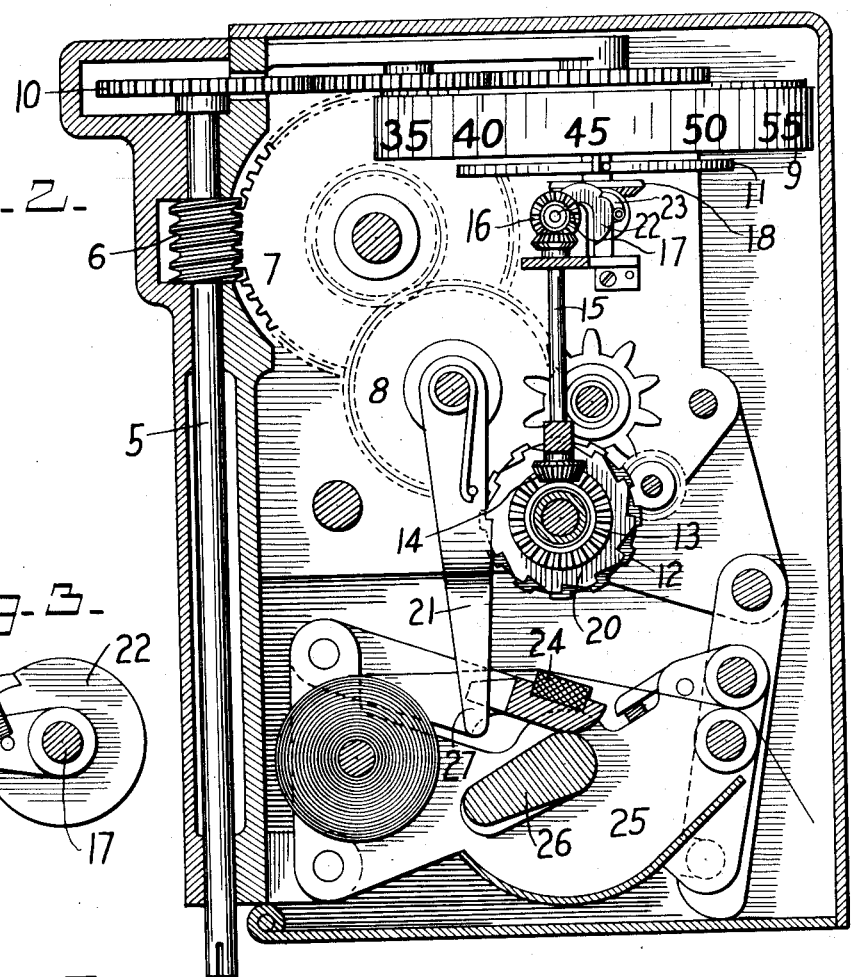

In the accompanying drawings Fig. 1 is a front elevation of a service recorder, with the casing in section, showing my invention embodied therein; Fig. 2 is a section taken on the line 2—2 of Fig. 1; Fig. 3 is a detail view of the one-way clutch; and Fig. 4 is a detail view of a portion of a record produced by the machine.

In these drawings I have illustrated one embodiment of my invention and have shown the same as forming a part of a recording device which preserves a record of various items relating to the operation of the vehicle, but it will be understood that the invention is not limited to such use, but may, if desired, constitute a separate unit to be applied to a vehicle for recording speed only. Further, the mechanism by which the desired result is accomplished may take various forms and that here shown has been chosen for the purpose of illustration only.

I have shown the recording device, in which the speed recorder is, in the present instance, embodied, as comprising a casing 1 having mounted therein a plurality of groups of recording elements, such as type wheels. The two main groups of these elements are shown at 2 and 3 and group 2 records mileage and the group 3 records time. Various other recording elements may be utilized to record other data, but it is not necessary to describe them in connection with the present invention. The time recording elements, or type wheels, 3 are driven from the clock 4 through suitable driving connections, not here shown. The mileage recorders 2 are driven from a moving part of the vehicle, such as one of the ground wheels or the driving shaft and, in the present machine, this is accomplished through a shaft 5 mounted in the rear portion of the casing 1 and adapted to be connected by means of a flexible shaft or the like with the moving part of the vehicle. Mounted on the shaft is a worm 6 which meshes with a worm wheel 7 which in turn is connected through gearing 8 with the mileage recording elements. Mounted in the upper portion of the casing is a fluctuating speedometer which may be of any suitable construction and is here shown as comprising an indicating drum 9 which rotates about a vertical axis and is driven by means of a train of gearing 10 from the shaft 5. Inasmuch as any suitable type of fluctuating speedometer may be used it is not necessary to illustrate or describe in detail the construction and operation of the speedometer here shown. Suffice it to say that it is advanced through the gearing 10 and against the tension of the spring 11 in such a manner as to cause the drum 9 to indicate at all times the speed at which the vehicle is moving, the indication being visible through a sight opening in the front wall of the casing 1.

In order to indicate and preserve a record of the highest speed at which the vehicle moves at any time during its operation I have provided a registering member in the form of a recording element, such as a type wheel, 12 which, as here shown, is mounted in axial alinement with the recording elements 2 and 3 and which is connected with a moving part of the vehicle in such a manner as to cause it to be advanced a distance determined by the speed at which the vehicle moves. Preferably this connection is established through the speedometer and the shaft 5 although the use of a visual indication, or a speedometer is not essential to the operation of the recorder. The type wheel 12 has secured thereto a beveled gear 13 which meshes with a beveled pinion 14 on a shaft 15. The shaft 15 is connected by beveled gearing 16 with a horizontal shaft 17 which is connected by beveled gearing 18 with the shaft 19 of the speedometer. The ratio of the gearing is such that the type wheel 12 will present to printing position the same numerals as appear on the speedometer drum at the sight opening in the casing.

In order that the record preserved by the recording element may show the highest speed attained by the vehicle I have provided means for retaining the recording element in the farthest advanced position to which it has been advanced during the period covered by the record. As here shown, this means consists of a ratchet wheel 20 with which cooperates a spring pressed pawl 21 which is held normally in engagement with the ratchet wheel and which prevents any reverse movement of the recording element. To prevent the speedometer itself being locked against rearward movement by the locking of the recording element I have interposed between the recording element and the speedometer a one way clutch which will cause the recording element to be advanced when the speedometer advances but, if after the recording element has been advanced to and locked in a certain position, say forty miles an hour, the speed falls, the speedometer can move rearwardly to indicate the true speed but the indicating element will remain at the highest speed. In other words, the speedometer can fluctuate and move independent of the recording means. If the speed at any time increases above that to which the recording element has been advanced the clutch will again pick up the recording element and advance it a further distance according to the speed attained. Various devices may be used for establishing this connection between the recording element and the speedometer and it may be located in various parts of the connecting mechanism, but as here shown the shaft 17 is formed in two parts and to that part of the shaft which is connected with the recording element I have secured a one toothed ratchet wheel 22 with which cooperates a pawl 23 which is secured to that part of the shaft 17 which is connected with the speedometer. It will be apparent that the pawl will carry the one toothed ratchet wheel with it so long as it continues to advance but as the speedometer moves rearwardly, because of the reduced speed, the pawl will be retracted from the tooth of the ratchet wheel, which will be retained in the position to which it has been advanced because of the locking of the recording element. The pawl will be free to move in either direction along the smooth periphery of the ratchet wheel until the speed exceeds the speed recorded by the recording element, at which time the pawl will again pick up and advance the ratchet wheel.

The recording element is retained in its farthest advanced position until a record has been manually taken therefrom and, preferably, it is released for rearward movement by the operation of the record taking mechanism. In the present instance where the recording element is in the form of a type wheel the record is taken by impression means in the form of a platen 24 carried by a pivoted frame 25. The free end of the platen frame is adapted to be engaged by a revolving arm, or cam, 26, which is so arranged with relation to the platen frame that it will elevate the platen into engagement with the type which is in printing position and will then move beyond the frame and permit the latter to drop by gravity. The cam 26 is manually actuated by any suitable means such as a knob shown at the lower right in Fig. 1. In the present construction the pawl 21, which locks the type wheel against reverse movement has an extension 27 which lies in the path of the cam 26 and will be engaged thereby after the platen has been moved into contact with the type wheel. This contact between the cam and the extension on the pawl causes the pawl to be moved out of engagement with the ratchet wheel and permits the same to return to its normal position. As here shown, where the recording element is connected with the speedometer by a one way clutch a spring 28 is connected with the recording element to move it to its initial position.

It will be understood, of course, that the record is, in the present machine, taken on a strip of paper which is supported in the service recorder and on which the record as a whole is printed. In Fig. 4 a section of the record is shown and the record taken from the speed recording element is shown at the left hand side under the heading "speed". Any means may be provided to enforce the printing of the record by the driver. The recording device is provided with means, not here shown, which make it necessary for the driver to print a record each time he starts or stops his engine and the speed record which is printed is the highest speed which has been attained during any one trip of the vehicle, that is, between the starting and stopping of the engine. It will be obvious, however, that it is not necessary that the driver himself should print the record, particularly where the speed recording device is used alone, as under these circumstances it might be preferable that a superintendent, or other person in charge, should print the record at the end of each trip or at the end of each period of service, thus taking a record of the highest speed attained during the interval.

While I have shown and described one embodiment of my invention I wish it to be understood that I do not desire to be limited to the details thereof as various modifications may occur to a person skilled in the art.

Having now fully described my invention what I claim as new and desire to secure by Letters Patent is:

1. In a mechanism of the character described, a speed controlled device adapted to be driven from a moving part of the vehicle and which advances and recedes as the speed of said part of said vehicle rises and falls, maximum speed registering means advanced by said speed controlled device, and means for returning said registering means to its initial position.

2. In a mechanism of the character described, a fluctuating speed controlled device, maximum speed recording means advanced by said speed controlled device, and printing means for said recording means adapted to release the recording means to permit the same to return to normal.

3. In a mechanism of the character described, a fluctuating speed controlled device, recording means advanced by said speed controlled device, retaining means for said recording means and printing means for said recording means adapted to actuate said retaining means.

4. In a mechanism of the character described, a speed controlled device, maximum recording means advanced by said speed controlled device, and manually actuated means for taking a record from said recording means and for releasing said recording means to permit the same to return to its initial position.

5. In a mechanism of the character described, a speed controlled device, recording means advanced by said speed controlled device, retaining means for said recording means, and manually actuated printing means for said recording means adapted to actuate said retaining means.

6. In a mechanism of the character described, a speed controlled device, registering means advanced by said speed controlled device, retaining means for said registering means and manually actuated means for releasing said retaining means.

7. In a mechanism of the character described, a speed controlled device having means for connecting it with a moving part of a vehicle and comprising recording means, means to hold said recording means against reverse movement, impression mechanism for said recording means, and means controlled by the operation of said impression means to release said recording means.

8. In a mechanism of the character described, a speed controlled device having means for connecting it with a moving part of a vehicle and comprising a type wheel, means to hold said type wheel against reverse movement, a platen to take a record from said type wheel, and means controlled by the operation of said platen to release said type wheel.

9. In a mechanism of the character described, a speed controlled device having means for connecting it with a moving part of a vehicle and comprising a type wheel, a ratchet wheel connected with said type wheel, a pawl held normally in engagement with said ratchet wheel to prevent the rearward movement of said type wheel, a platen to take a record from said type wheel, and means to actuate said platen and move said pawl out of engagement with said ratchet wheel.

10. In a mechanism of the character described, a speed registering element, means to normally prevent the rearward movement of said element, driving mechanism adapted to be actuated by a moving part of a vehicle to advance said registering element and comprising a part which advances and recedes as the speed of the vehicle rises and falls, a one way clutch interposed between said registering element and said part of said driving mechanism, and means for causing said registering element to return to its initial position.

11. In a mechanism of the character described, a speed recording element, means to normally prevent the rearward movement of said element, driving mechanism adapted to be actuated by a moving part of a vehicle to advance said recording element and comprising a part which advances and recedes as the speed of the vehicle rises and falls, a one way clutch interposed between said recording element and said part of said driving mechanism, and means for taking a record from said recording element.

12. In a mechanism of the character described, a speed recording element, means to normally prevent the rearward movement of said element, driving mechanism adapted to be actuated by a moving part of a vehicle to advance said recording element and comprising a part which advances and recedes as the speed of the vehicle rises and falls, a one way clutch interposed between said recording element and said part of said driving mechanism, and manually controlled means for taking a record from said recording element for causing said recording element to be restored to its initial position.

13. In a mechanism of the character described, a speed recording element, a driving mechanism to connect said recording element with a moving part of a vehicle, means to prevent the rearward movement of said recording element, a device for taking a record from said recording element, and means controlled by said record taking device to release said recording element for rearward movement.

14. In a mechanism of the character described, a type wheel, driving means to connect said type wheel with a moving part of a vehicle, a ratchet wheel connected with said type wheel, a pawl held normally in engagement with said ratchet wheel, a platen to take a record from said type wheel, and a device to actuate said platen, said pawl having a part arranged to be engaged by said device after the record has been taken from said type wheel.

15. In a mechanism of the character described, a speedometer, a recording element operatively connected with said speedometer, means to hold said element against reverse movement, a device to take a record from said recording element, and means to actuate said device and to release said recording element.

16. In a mechanism of the character described, a speedometer, a recording element, a driving connection between said speedometer and said recording element comprising a one way clutch, means to hold said recording element normally against reverse movement, a device to take a record from said recording element, and means to actuate said device and to cause said recording element to be restored to its initial position.

In testimony whereof, I affix my signature hereto.

JOHN F. OHMER, Jr.